United States Patent [19]

Oblon

[11] Patent Number: 4,779,609

[45] Date of Patent: Oct. 25, 1988

[54] DEVICE FOR CHANGING TEMPERATURE OF MATERIAL THEREIN

[76] Inventor: Ronald P. Oblon, 19 Silver St., Meriden, Conn. 06450

[21] Appl. No.: 97,689

[22] Filed: Oct. 16, 1987

Related U.S. Application Data

[62] Division of Ser. No. 890,017, Jul. 28, 1986, Pat. No. 4,722,323.

[51] Int. Cl.$^4$ .............................................. F24J 1/00
[52] U.S. Cl. ................................................ 126/263
[58] Field of Search ..................... 126/263, 204, 262; 128/403; 62/4; 44/3.1; 220/436

[56] References Cited

U.S. PATENT DOCUMENTS 2,620,788  12/1952  Rivoche et al. ................... 126/263

Primary Examiner—Randall L. Green
Attorney, Agent, or Firm—CTC & Associates

[57] ABSTRACT

A device for changing the temperature of material placed therein by a user of the device comprises an inner member having an open end for receiving and containing the material the temperature of which is to be changed, providing the device with an outer envelope, and a multi-component temperature changing composition within the outer envelope and activatable by mixing. The inner and outer members are movable relative to each other to agitate and mix and activate the composition, thus to create an endothermic reaction or an exothermic reaction. In two embodiments, the members are rigid. In one of these two embodiments, the composition is activatable by rotational movement of the members, and in the other, the composition is activatable by telescopic movement of the members. In a third embodiment, the inner and outer members are flexible and the composition is activatable by squeezing the members together.

5 Claims, 3 Drawing Sheets

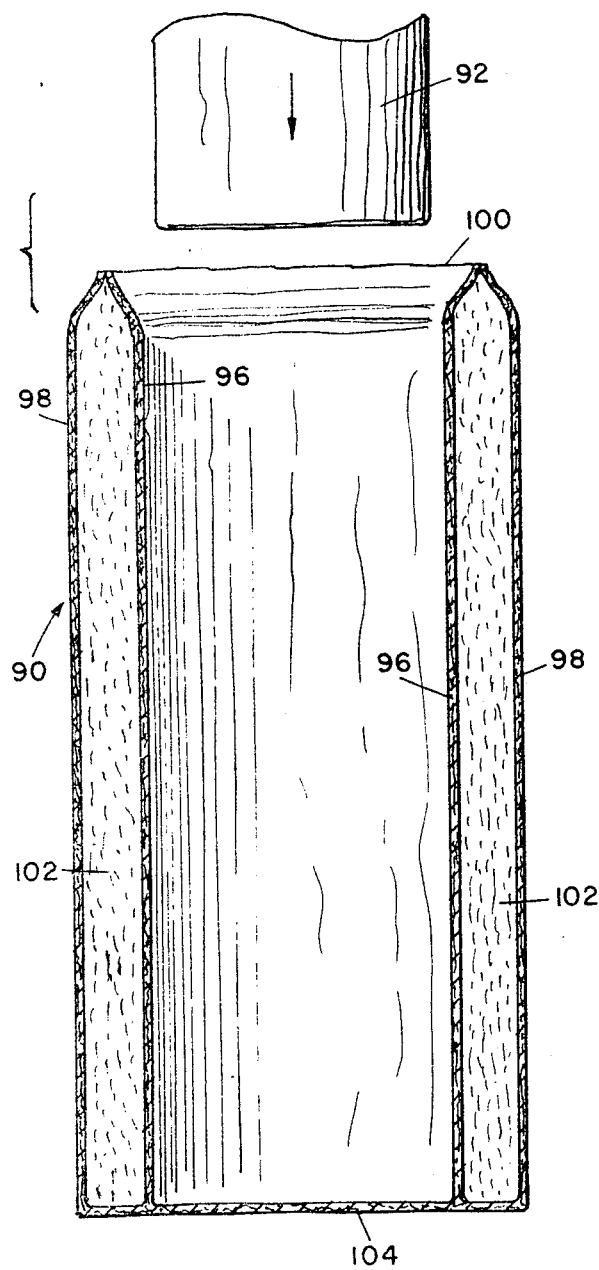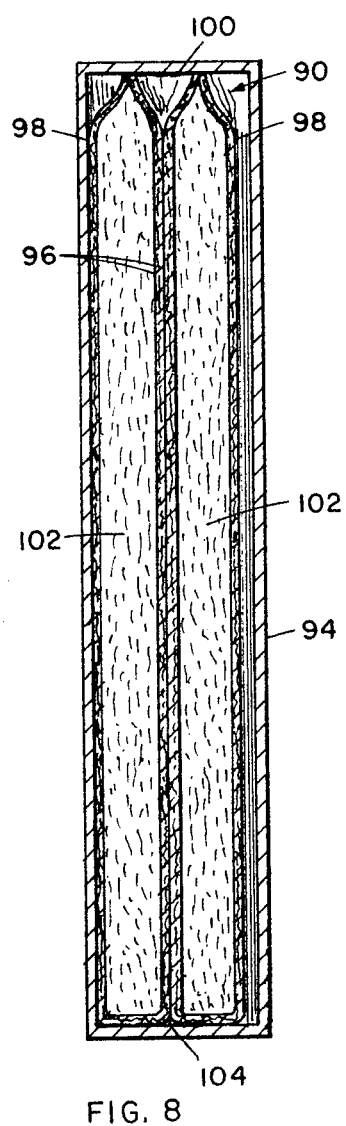
FIG. 7
FIG. 8

DEVICE FOR CHANGING TEMPERATURE OF MATERIAL THEREIN

This is a divisional of application Ser. No. 890,017, filed July 28, 1986, now U.S. Pat. No. 4,722,323.

BACKGROUND OF THE INVENTION

This invention relates to a device for changing the temperature of material placed therein and more particularly to such a device which can be used to refrigerate or heat medical specimens or foodstuffs or beverages after placement therein by medical personnel in the case of medical specimens that must be refrigerated or cooled or by other personnel in the case of foodstuffs or beverages.

It is often necessary or highly desirable to refrigerate certain medical specimens such as spinal fluid, blood and other body fluids, pending the testing thereof. If refrigerated, the time periods during which tests must be completed are extended.

Heretofore, there has been no convenient way to effect such refrigeration.

It is desirable also to be able to refrigerate or heat such items as beverages and foodstuffs when desired.

Accordingly, it is an important object of the invention to provide a self-refrigerating or self-heating device for automatically refrigerating or heating materials placed therein by medical or other personnel.

It is another object to provide such a device that is of simple, inexpensive construction and is simple to use, and that is disposable.

The following U.S. Patents were found in a search hereon;

| U.S. Pat. No. | Date | Inventor |
| --- | --- | --- |
| 3,951,127 | April 20, 1976 | Watson et al. |
| 4,057,047 | November 8, 1977 | Gossett |
| 4,093,424 | June 6, 1978 | Yoshida et al. |
| 4,114,591 | September 19, 1978 | Nakagawa |
| 4,552,190 | June 11, 1985 | Kuhn et al. |
| 4,528,218 | July 9, 1985 | Maione |

Watson et al. discloses a device that is said to maintain a constant temperature after activation. A first chemical is within a container and actuation is accomplished by adding a second chemical to the container through a valve. The device is intended for use as a warm baby matress, a warm blanket or a hot water bottle substitute, for example.

Gossett teaches a thermal pack comprising three bags, two of which are of the same size and contain chemicals. The third bag contains water and is rupturable by by manual pressure, allowing the water to react with the chemicals to provide either in increase or a decrease in temperature. The pack is flexible so that it can conform to the surface being treated.

Yoshida et al. relates to a thermogenic composition that generates a large amount of heat merely through contact with air, without the addition of water. The composition is kept in a case and is exposed to oxygen when the case is perforated by a needle, when a cover film is peeled off, when a pull-tab is removed, or when a screw-type perforating mechanism is used. Suggested uses are for heating many items exterior to the case.

Nakagawa relates to an exothermic metallic composition for a body warmer. The composition is contained in a porous bag to be applied to a portion of a human body.

Kuhn et al. discloses a flexible heat pad which is actuated electrochemically.

Maione discloses a disposable device for self-heating or self-cooling drinks or other foodstuffs by an exothermic or an endothermic reaction. The device has a outer diaphragm 7, a room 8 for a solid reactant and an inner breaker, a room 9 for a liquid reactant and an inner breaker and a room 10 for liquid or solid foodstuff. After the liquid or solid foodstuff is introduced into room 10, room 10 is heat sealed with a peelable diaphragm 3, which assures a long conservation of the food product in room 10 and is removed before using the contents of room 10. Thus, Maione is limited to pre-packaged foodstuff.

Maione is the only prior art example of a device which involves heating or cooling something which is within the device.

A self-refrigerating specimen container in accordance with the invention prevents specimen deterioration and possible false results from a deteriorated specimen. The invention also avoids having to obtain a second specimen because a first specimen has become spoiled. At present, it is common practice to refrigerate specimens in pans of ice, but that practice has numerous disadvantages, among which are the time wasted procuring an ice holding container and a few pounds of ice, the difficulty experienced with speciment labels in ice pans, in which the ice and melted ice commonly blur the label information or cause the specimen labels to fall off the specimen containers.

It is therefore an additional object of the invention to provide a self-refrigerating device for medical specimens, which device overcomes the disadvantages enumerated in the preceding paragraph.

The foregoing and other objects and advantages will appear hereinafter.

SUMMARY OF THE INVENTION

A device embodying the invention for changing the temperature of material placed therein by a user of the device comprises an inner member having an open end for receiving and containing the material, the temperature of which is to be changed, an outer member providing the device with an outer envelope, and a multi-component temperature changing composition within the outer envelope and activatable by mixing. The inner and outer members are movable relative to each other to agitate and mix and activate the composition, thus to create an endothermic reaction or an exothermic reaction.

In two embodiments, the members are rigid. In one of these two embodiments, the composition is activatable by rotational movement of the members, and in the other, the composition is activatable by telescopic movement of the members. In a third embodiment, the inner and outer members are flexible and the composition is activatable by squeezing the members together.

DESCRIPTION OF THE DRAWING

FIG. 7 is an axial sectional view of a third device that is a preferred embodiment of the invention, shown positioned to receive an article; and FIG. 8 is a view showing the device of FIG. 7 in collapsed condition prior to use and packaged in a rigid container.

DESCRIPTION OF THE INVENTION

Figure 2:
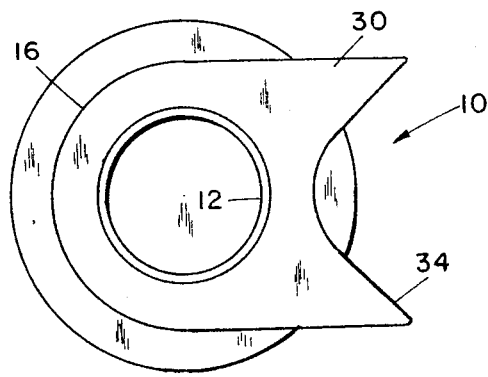
FIG. 2 is an end view of the device, taken on line 2—2 of FIG. 1.
Figure 1:
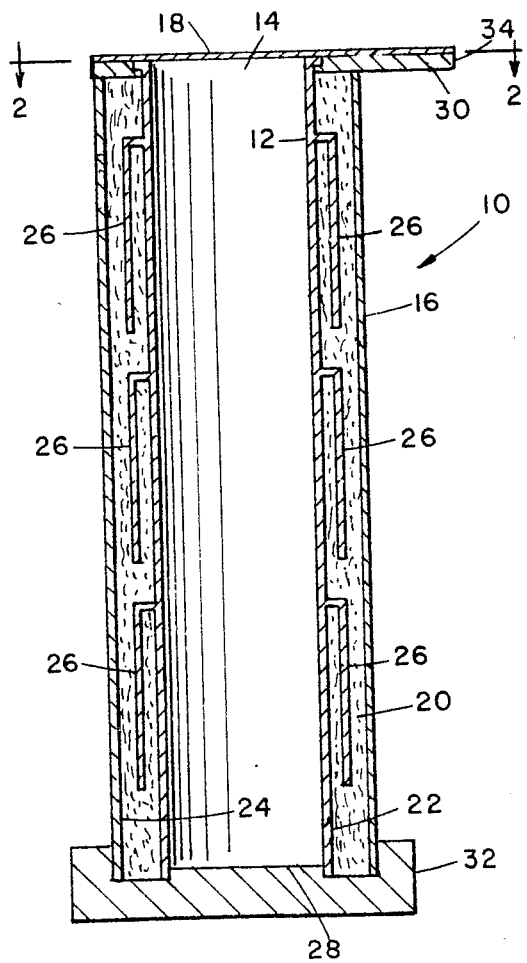
FIG. 1 is an axial sectional view of a first device that is a preferred embodiment of the invention, the device including an inner member and an outer member.

FIG. 1 shows in axial section a first device 10 that is a preferred embodiment of the invention. FIG. 2 is an end view of device 10.

Figure 3:
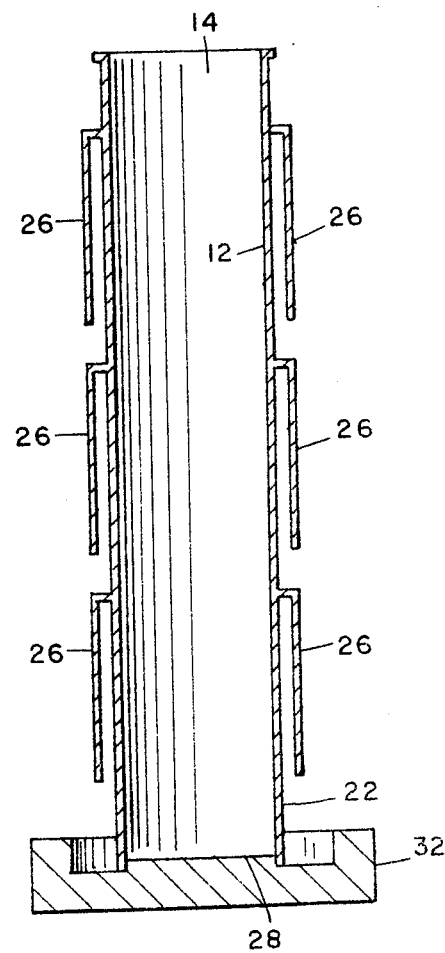
FIG. 3 is an axial sectional view of the inner member of the device of FIG. 1 by itself.

Device 10 comprises a rigid inner member 12, that is also shown in FIG. 3, having an open end 14 for receiving and containing material (not shown), such as medical specimens of body fluid, the temperature of which is to be changed. Inner member 12 is typically of a size to receive a plurality of such specimens, each suitably labeled.

Device 10 further comprises a rigid outer member 16 providing device 10 with an outer envelope and having an open end 18 (substantially axially coincident with open end 14 of inner member 12) for receiving inner member 12.

Additionally, device 10 comprises a multi-component temperature changing composition 20 within outer member 16, and activatable by mixing of its components to provide an exothermic reaction or an endothermic reaction to lower or raise the temperature of the material within inner member 12, as desired. Such multi-component compositions are known and need not be further described herein.

More specifically, inner and outer members 12 and 16 are cylindrical and are coaxial and have outer and inner cylindrical surfaces 22 and 24, respectively, providing an annular space therebetween, and temperature changing composition 20 is located within the outer envelope. Specifically, composition 20 is within the annular space.

Device 10 further comprises fins 26 integral with either member 12 or member 16 and projecting either outwardly from outer cylindrical surface 22 or inwardly from inner cylindrical surface 24 to be within composition 20 in the annular space between surfaces 22 and 24. As shown, fins 26 are integral with outer cylindrical surface 22.

Device 10 additionally comprises means for imparting rotational movement of members 12 and 16 relative to each other to agitate and mix and activate composition 20. As shown, inner member 12 includes a closed end 28 at the end of member 12 remote from open end 14 and members 12 and 16 have overlapping portions whereby members 12 and 16 are suitably secured together.

To revert to the means for imparting relative rotational movement to members 12 and 16, this means includes a lever 30 integral with and projecting transversely outwardly from open end 18 of outer member 16 and a base 32 integral with inner member 12 and projecting transversely outwardly beyond the envelope of outer member 16. Base 32 provides a knob which may be knurled or grooved for ease of gripping.

To activate composition 20, the user grasps lever 30 with one hand and base 32 with the other hand and twists members 12 and 16, thus causing fins 26 to activate composition 20 as aforesaid.

It is also noteworthy that lever 30 has an outer end 34 that will prevent device 10 from rolling when on a horizontal surface, such as while specimens are being collected.

Further, it is contemplated that a cover (not shown) be provided for device 10, the cover suitably being of synthetic rubber.

Members 12 and 16 may be of suitable plastic material which may be transparent for viewing purposes.

The size of members 12 and 16 may vary according to the number, typyes and volumes of speciments that are to be accommodated in device 10.

Figure 4:
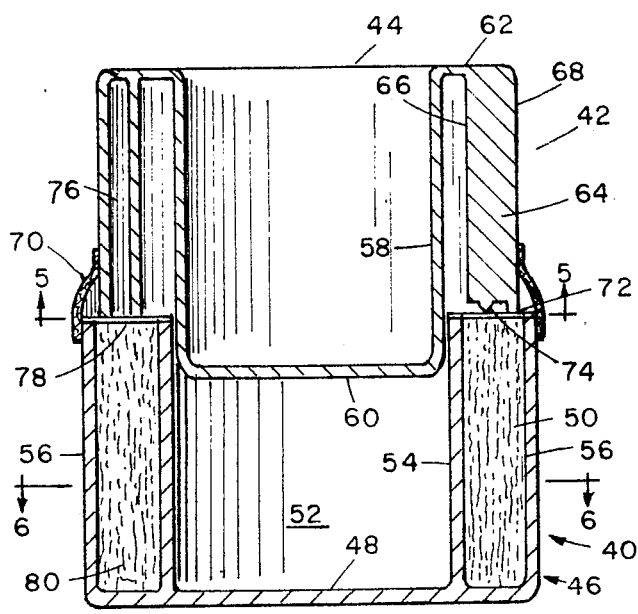
FIG. 4 is an axial sectional view of a second device that is a preferred embodiment of the invention.
Figure 5:
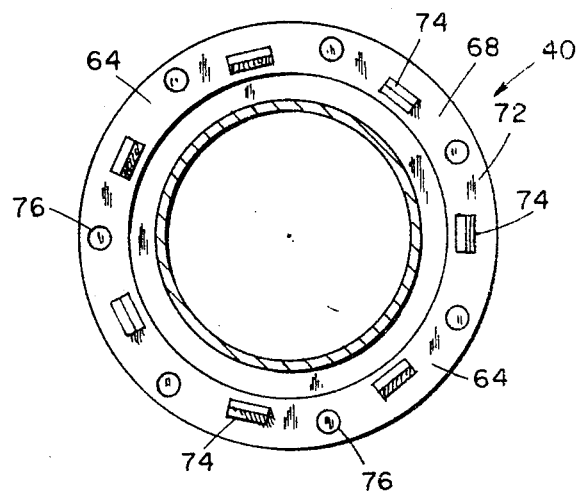
FIG. 5 is a view taken on line 5—5 of FIG. 4.
Figure 6:
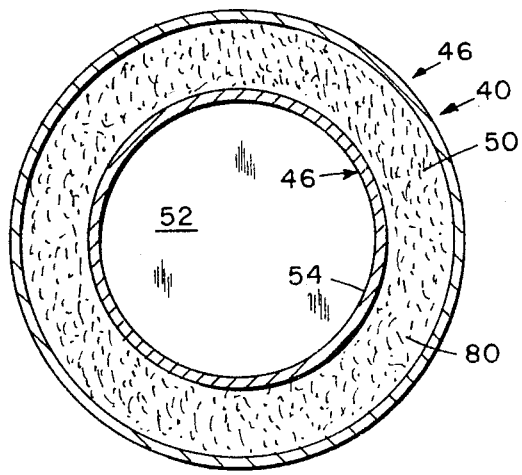
FIG. 6 is a view taken on line 6—6 of FIG. 4.

FIGS. 4, 5 and 6 show a second device 40 that is a second preferred embodiment of the invention. Device 40 comprises a rigid inner member 42 having an open end 44 for receiving material the temperature of which is to be changed, and a rigid outer member 46 providing device 40 with an outer envelope.

Inner and outer members 42 and 46 are, as shown, generally cylindrical, but they need not be.

To simplify the description, outer member 46 will be described first. Outer member 46 has a closed bottom 48 and an axially extending annular well 50 extending axially a predetermined distance from bottom 48 to an open end at the top of outer member 46, thus providing outer member 46 with a main cylindrical portion 52 surrounded by an inner cylindrical wall 54 which is in turn surrounded by an outer cylindrical wall 56, with well 50 between walls 54 and 56.

Inner member 42 has a central cup shaped portion 58 depending from open end 44 to a closed bottom 60. The outside diameter of portion 58 is slightly smaller than the inside diameter of wall 54 so as to be receivable therewithin. Extending radially outwardly from portion 58 at open end 44 is a flange 62, depending from the outer periphery of which is a skirt 64 having an inner cylindrical surface 66 of greater diameter than the outside diameter of wall 54 and an outer cylindrical surface 68 of lesser diameter than the inside diameter of wall 56, so that skirt 64 is receivable in well 50. The lower end of skirt 64 is spaced axially above bottom 60, so that cup shaped portion 68 can be, and as shown is, within main cylindrical portion 52 of outer member 46 while skirt 64 is not in well 50.

Releasable means is provided for maintaining inner and outer members 42 and 46 in the just-described relative positions, as shown in FIG. 4. As shown, the releasable means is a pressure sensitive tape 70, engaging members 42 and 46 and wrapped therearound.

Skirt 64 has a free end 72 which is provided with a plurality of evenly circumferentially spaced protruding cutting edges 74, between each adjacent pair of which is the open end of an axial hole 76.

The open end of wall 50 is covered with a rupturable membrane 78.

Device 40 also has a multi-component temperature changing composition 80 activatable by mixing. Composition 80 is located within the outer envelope provided by outer member 46, specifically in well 50.

To activate composition 80, the user, after placing the medical specimen(s) or other material the temperature of which is to be changed in cup shaped portion 58 and possibly applying a cover (not shown) thereto, telescopes inner and outer members 42 and 46 together, causing cutting edges 74 to rupture membrane 78 and skirt 64 to enter well 50, until bottoms 48 and 60 engage one another. As skirt 64 travels downwardly through well 50 it agitates composition 80 to mix and activate the same, and composition 80 moves into holes 76.

Members 42 and 46 may be of suitable plastic material which may be transparent for viewing purposes.

The size of members 42 and 46 may vary according to the number, types and volumes of specimens that are to be accommodated in device 40.

FIGS. 7 and 8 show a third device 90 that is a third preferred embodiment of the invention, FIG. 7 showing device 90 positioned to receive material in the form of an article 92, such, for example as a can of soda or soup, the temperature of which is to be changed.

Device 90 includes a flexible, collapsible sack, shown in FIG. 8 in collapsed form prior to use and packaged in a rigid container 94.

Device 90 has an inner member 96 and an outer member 98 that provides device 90 with an outer envelope.

Members 96 and 98 are of flexible material, such as suitable plastic which is preferably transparent for viewing purposes.

Device 90 will be further described with reference to FIG. 7, in its opened-up condition, in which members 96 and 98 are cylindrical and axially co-extensive. Inner member 96 has an open end 100 at its top where it is circumferentially sealed to the top of outer member 98.

Device 90 further has a multi-component temperature changing composition 102 within the outer envelope provided by outer member 98, specifically in an annular space between inner and outer members 96 and 98.

At the end of device 90 remote from open end 100, device 90 is provided with a bottom 104 in the form of a single sheet of suitable plastic material sealed to the axial ends of members 96 and 98 remote from open end 100 to retain composition 102 in place.

No composition 102 is included in bottom 104, thus facilitating collapse of device 90 and minimizing the size of container 94 in which device 90 is packaged.

Device 90 is sized and shaped for use with particular sized articles 92 and may be readily provided in a plurality of sizes and shapes to accommodate various articles 92.

To use device 90, it is removed from its rigid container 94 and vigorously squeezed once or twice to mix and activate composition 102. Device 90 is then opened to the condition shown in FIG. 7 and article 92 is placed therein by moving same into open end 100 until it reaches bottom 104.

The invention is well suited to the attainment of the stated objects and advantages and others.

The disclosed details are not to be taken as limitations on the invention except as those details may be included in the appended claims.

What is claimed is:

1. A device for changing the temperature of material placed therein by a user, said device comprising an inner rigid cylindrical member having an open end for receiving and containing the material the temperature of which is to be changed, an outer rigid cylindrical member coaxial with said inner member and providing said device with an outer envelope, and a multi-component temperature changing composition within said outer envelope and activatable by mixing, said inner and outer members being telescopically movable reltive to each other to agitate and mix and activate said composition, and wherein said outer member has a closed bottom and a well extending from said bottom to an open end at the top of said outer member and said inner member has a skirt sized and shaped to enter said well and aligned with said well and said multi-component temperature changing composition is within said well.

2. A device according to claim 1 wherein said composition absorbs heat when activated, thus to lower the temperature of said material.

3. A device according to claim 1 wherein said composition gives off heat when activated, thus to raise the temperature of said material.

4. A device according to claim 1 further comprising a rupturable membrane sealed to said outer member and covering said wall.

5. A device according to claim 4 wherein said skirt has a free end provided with a plurality of circumferentially spaced protruding cutting edges for rupturing said membrane to permit said skirt to enter said well to activate said composition, and said skirt further has a plurality of holes opening at said free end to receive said composition as said skirt travels downwardly in said well.

* * * * *